(12) United States Patent
Volmering et al.

(10) Patent No.: US 9,555,825 B2
(45) Date of Patent: Jan. 31, 2017

(54) STEERING COLUMN

(71) Applicant: TRW Automotive U.S. LLC, Livonia, MI (US)

(72) Inventors: Zachery R. Volmering, Lafayette, IN (US); Robert Geyer, Lafayette, IN (US); Richard J. Eckhart, Buck Creek, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 28 days.

(21) Appl. No.: 14/538,078

(22) Filed: Nov. 11, 2014

(65) Prior Publication Data

US 2016/0129930 A1   May 12, 2016

(51) Int. Cl.
*B62D 1/20* (2006.01)
*B62D 1/187* (2006.01)

(52) U.S. Cl.
CPC .............. *B62D 1/20* (2013.01); *B62D 1/187* (2013.01)

(58) Field of Classification Search
CPC ............ B62D 1/16; B62D 1/18; B62D 1/185; B62D 1/187; B62D 1/20; B62D 3/02
See application file for complete search history.

(56) References Cited

U.S. PATENT DOCUMENTS

| | | | |
|---|---|---|---|
| 2,667,746 A | | 2/1954 | Kumpf et al. |
| 4,548,291 A | * | 10/1985 | Tanaka ............... B62D 1/22 180/321 |
| 4,649,769 A | * | 3/1987 | Venable .............. B62D 1/184 403/105 |
| 5,509,324 A | * | 4/1996 | Cymbal ............... B62D 1/16 403/109.3 |
| 5,560,650 A | * | 10/1996 | Woycik ............... B62D 1/192 280/777 |
| 5,711,189 A | | 1/1998 | Cartwright et al. |
| 6,467,807 B2 | * | 10/2002 | Ikeda ................. B62D 1/184 280/775 |
| 7,240,760 B2 | * | 7/2007 | Sherwin ............... B62D 6/008 180/421 |
| 2005/0275206 A1 | * | 12/2005 | Gerlind ............... B62D 1/181 280/775 |

FOREIGN PATENT DOCUMENTS

DE    19524796 A1 *  1/1997 ............ B62D 1/197
JP    2001213330 A *  8/2001

* cited by examiner

*Primary Examiner* — Laura Freedman
(74) *Attorney, Agent, or Firm* — Tarolli, Sundheim, Covell & Tummino LLP

(57) ABSTRACT

A steering column comprises (a) an upper column assembly and (b) a bevel gear box assembly. The bevel gear box assembly is attached to the upper column assembly to form an integrated structure. The bevel gear box assembly also is operatively coupled to the upper column assembly such that rotational movement is transferred from the upper column assembly to the bevel gear box assembly.

12 Claims, 4 Drawing Sheets

STEERING COLUMN

TECHNICAL FIELD

The present invention relates to a steering column.

BACKGROUND OF THE INVENTION

A known steering column includes a first steering column member that is axially movable relative to a second steering column member to effect telescoping of the steering column. A releasable telescope locking mechanism locks the first steering column member against axial movement relative to the second steering column member. The known steering column also includes an input shaft connected to the first steering column member via a universal joint to effect pivoting or tilting of the steering column. A releasable tilt locking mechanism locks the input shaft against tilting or pivotal movement relative to the first steering column member.

SUMMARY OF THE INVENTION

In a representative embodiment of the present invention, a steering column comprises (a) an upper column assembly and (b) a bevel gear box assembly. The bevel gear box assembly is attached to the upper column assembly to form an integrated structure. The bevel gear box assembly also is operatively coupled to the upper column assembly such that rotational movement is transferred from the upper column assembly to the bevel gear box assembly.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF EMBODIMENTS

Figure 1:
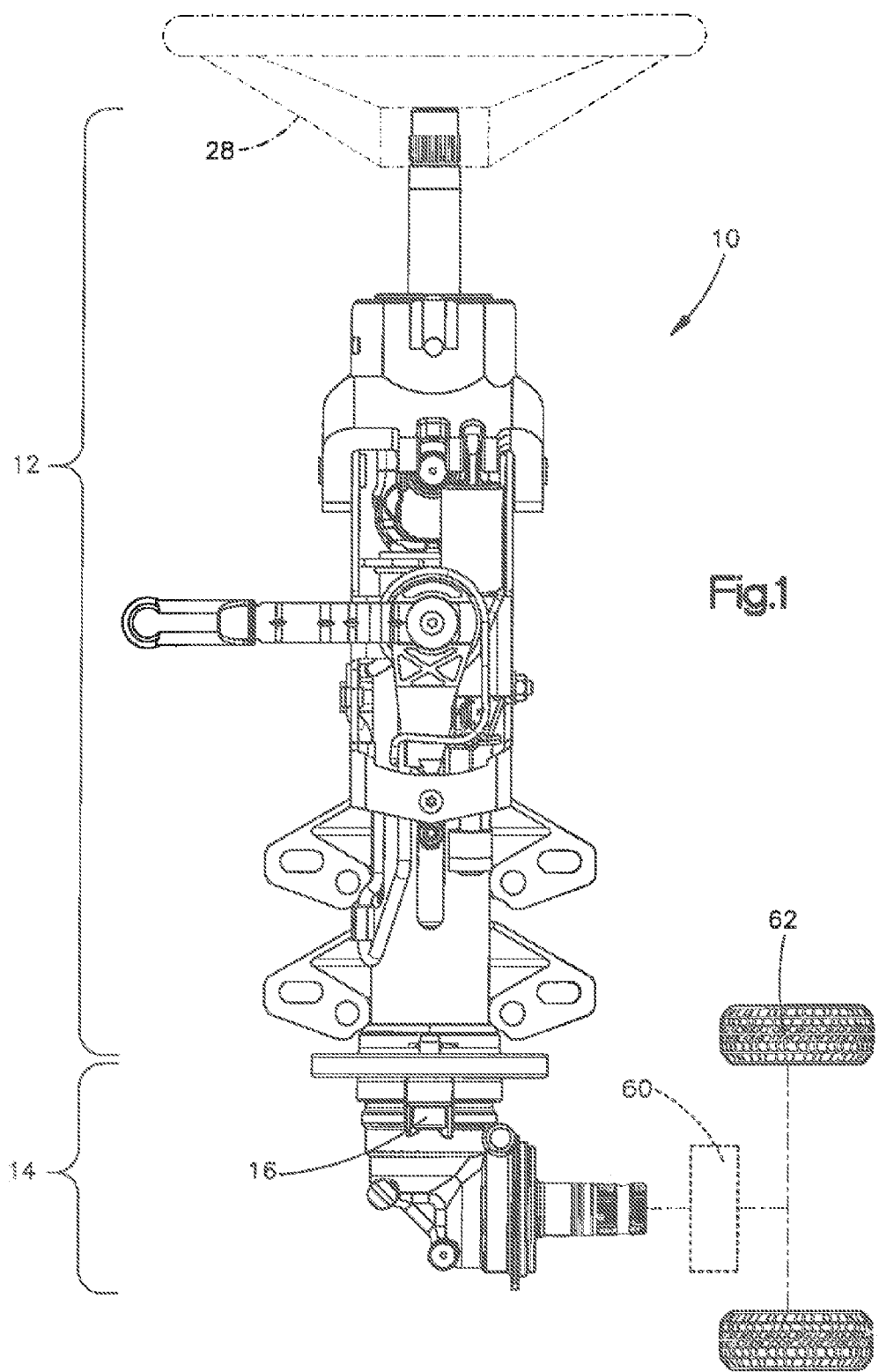
FIG. 1 is a side view of a steering column constructed in accordance with an example embodiment of the present invention.
Figure 2:
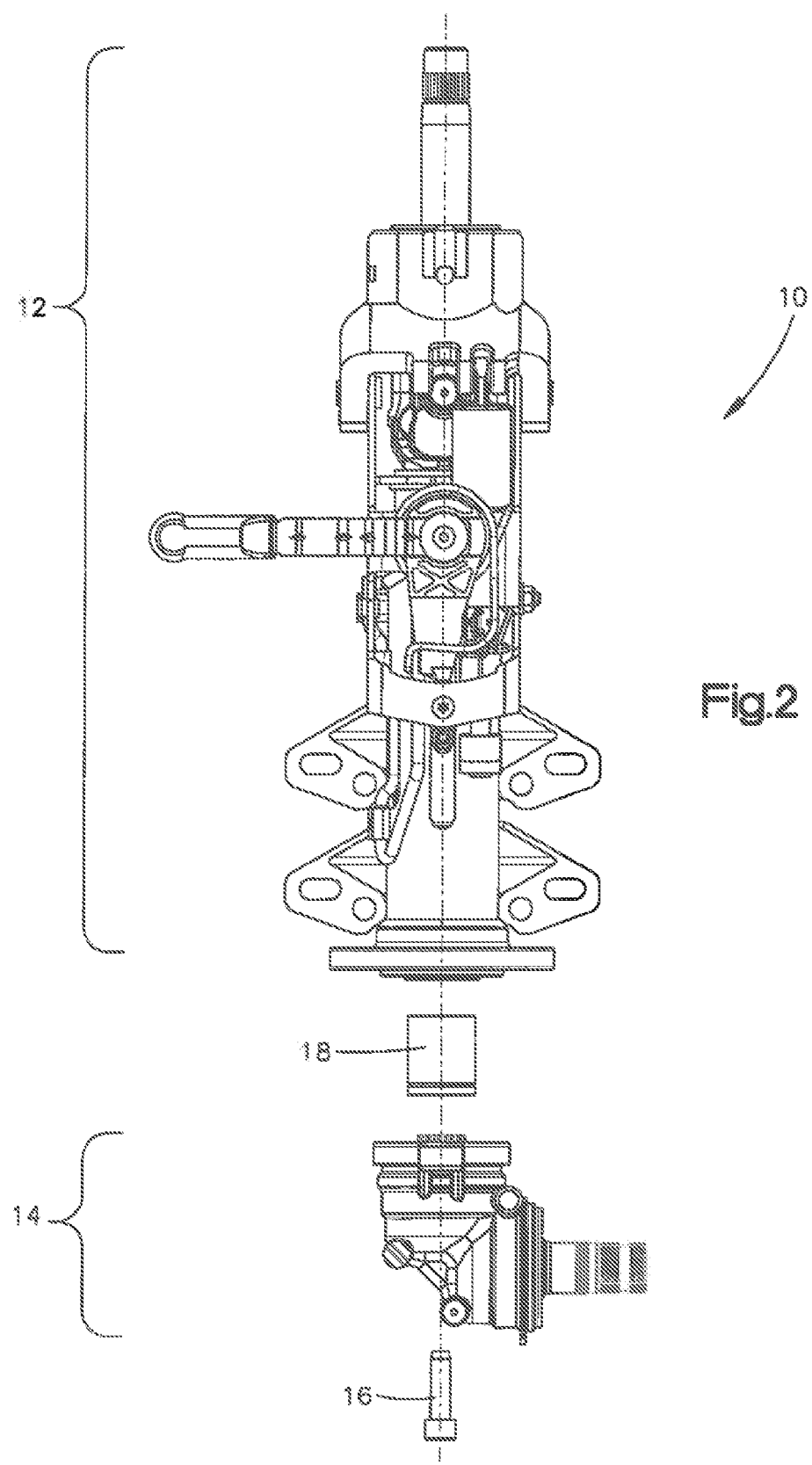
FIG. 2 is a partially exploded view of the steering column of FIG. 1.
Figure 3:
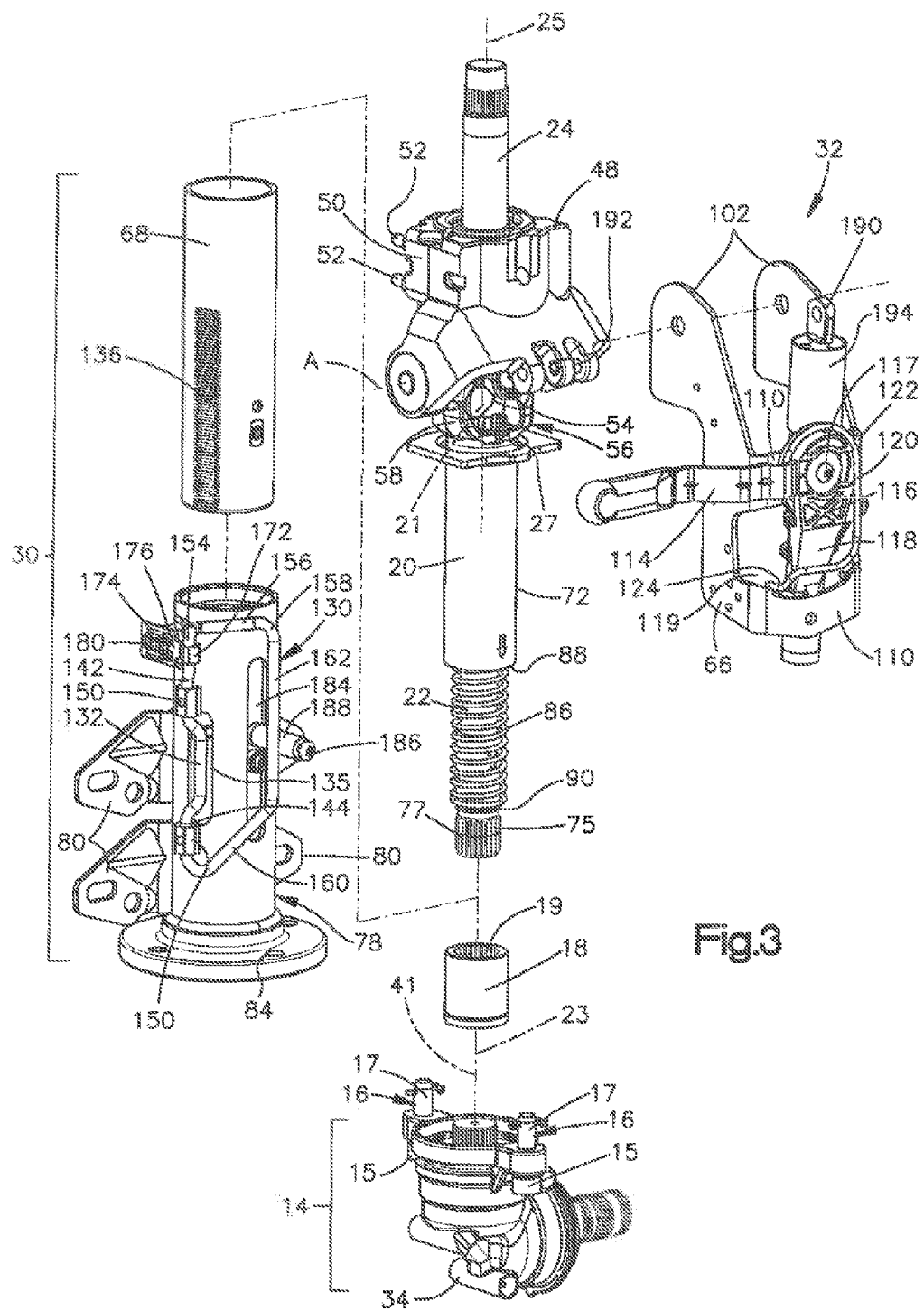
FIG. 3 is a more folly exploded view of the steering column of FIG. 1.
Figure 4:
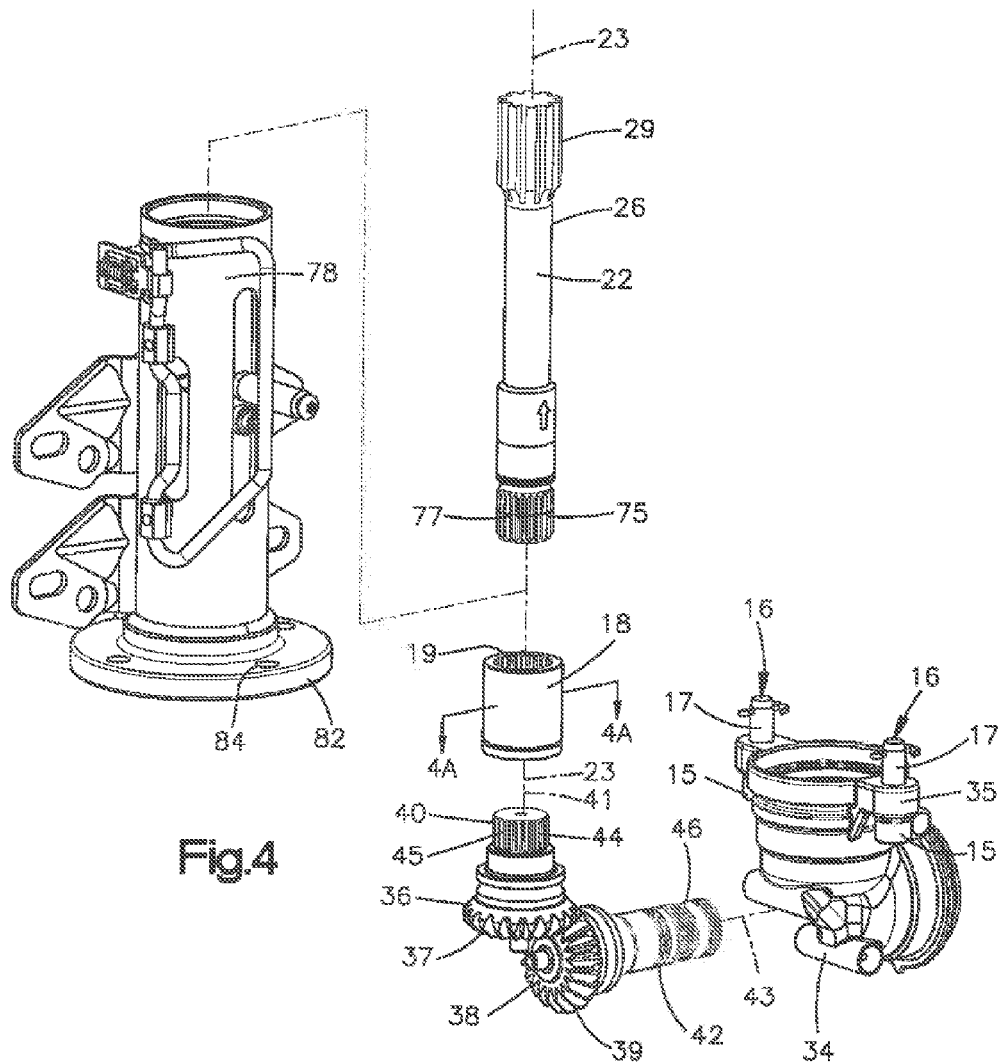
FIG. 4 is a more fully exploded view of a lower portion of the steering column of FIG. 1.
Figure 4A:
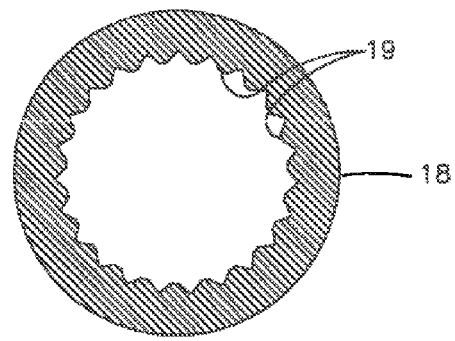
FIG. 4A is a sectional view taken along view line 4A-4A of FIG. 4.

FIGS. 1-3 illustrate an axially and angularly adjustable vehicle steering column 10, in accordance with an example of the present invention. The steering column 10 comprises an upper column assembly 12 and a bevel gear box assembly 14. The upper column assembly 12 and the bevel gear box assembly 14 are securely connected or attached to each other in a substantially rigid manner by two fasteners 16. The connection or attachment between the upper column assembly 12 and the bevel gear box assembly 14 provided by the fasteners 16 results in the steering column 10 being a single integrated unit or structure. Stated differently, the upper column assembly 12 and the bevel gear box assembly 14 are directly connected, attached or joined together such that they may be handled, shipped and/or transported as a unit and installed or mounted in a vehicle (not shown) as a unit without a need to handle, install or mount either the upper column assembly or the bevel gear box assembly separately or individually. In addition to the structural attachment or connection provided by the fasteners 16, the upper column assembly 12 and the bevel gear box assembly 14 are operatively coupled or connected to each other by a sleeve 18 with internal splines 19 (FIGS. 3 and 4A). The sleeve 18 ensures that rotational movement is transmitted between the upper column assembly 12 and the bevel gear box assembly 14, as set out in more detail below.

As shown in FIG. 3, the upper column assembly 12 comprises a rotatable upper steering column member 20, a rotatable lower steering column member 22, and a rotatable input shall 24. The input shaft 24 is uppermost in the steering column 10 and is operatively coupled at its lower end portion to an upper end portion 27 of the upper steering column member 20. The operative coupling between the input shaft 24 and the upper steering column member 20 enables rotational movement of the input shaft about its central longitudinal axis 25 to be transmitted to the upper steering column member.

The input shaft 24 is also pivotable relative to the upper steering column member 20. More specifically, a lower end portion of the input shaft 24 extends into an upper housing 48. Bearings (not shown) are located in the upper housing 48 and support the input shaft 24 for rotation relative to the upper housing. A cover 50 is connected to the upper housing 48 by screws 52. The cover 50 is removable from the upper housing 48 to permit access to the bearings (not shown) for repair and maintenance.

The lower end portion of the input shaft 24 is connected to a first yoke 54 of a universal joint 56. A second yoke 58 of the universal joint 58 is connected to the upper end portion 27 of the upper steering column member 20. The operative coupling between the input shaft 24 and the upper steering column member 20 through the universal joint 56 is such that rotational movement of the input shaft about its central longitudinal axis 25 effects rotational movement of the upper steering column member about its central longitudinal axis 21. The operative coupling between the input shaft 24 and the upper steering column member 20 through the universal joint 56 is also such that the input shaft 24 can pivot relative to the upper steering column member 20 about a pivot axis A of the universal joint 56. The pivot axis A is transverse to both the central longitudinal axis 25 of the input shaft 24 and the central longitudinal axis 21 of the upper steering column member 20.

A tubular lower end portion 72 of the upper steering column member 20 telescopically receives the upper end portion 26 (FIG. 4) of the lower steering column member 22. The lower end portion 72 of the upper steering column member 20 is operatively coupled to the upper end portion 26 of the lower steering column member 22 via splines (not shown) on an inner circumferential surface of the lower end portion of the upper steering column member and mating splines 29 on an outer circumferential surface of the upper end portion of the lower steering column member. The operative coupling between the upper steering column member 20 and the lower steering column member 22 through the splines is such that rotational movement of the upper steering column member 20 about its central longitudinal axis 21 effects rotational movement of the lower steering column member 22 about its central longitudinal axis 23. The operative coupling between the upper steering column member 20 and the lower steering column member 22 through the splines also permits the upper steering column member 20 and the lower steering column member 22 to be telescoped or moved axially relative to one another.

A coil spring 86 circumscribes the lower steering column member 22 below the splines 29 on the outer circumferential surface of the upper end portion 28 of the lower steering column member. The coil spring 86 acts between an axial end surface 88 of the upper steering column member 20 and a flange 90 connected to the lower steering column member 22. The coil spring 86 biases the upper steering column member 20 in a vertical direction, as viewed in FIG. 3, relative to and away from the lower steering column member 22.

A lower end portion 75 (FIG. 3) of the lower steering column member 22 is effectively the output shaft of the upper column assembly 12. The bevel gear box assembly 14 is operatively coupled to the lower end portion 75 of the tower steering column member 22 through the internally splined sleeve 18. The bevel gear box assembly 14 is also securely connected or attached to the upper column assembly 12 in a substantially rigid manner by the fasteners 16. The fasteners 16 engage both a housing 34 of the bevel gear box assembly 14 and a tubular support 78, which is a component of the upper column assembly 12. The tubular support 78 forms a housing for the lower steering column member 22. The tubular support 78 supports the lower steering column member 22 through a bearing (not shown) for rotation relative to the tubular support. The bearing (not shown) is mounted inside the tubular support 78 in any known manner. The tubular support 78 is mounted on a frame (not shown) of a vehicle in any known manner, such as by fasteners (not shown) that engage the vehicle frame and also engage mounting brackets 80 permanently attached, such as by welding, to the exterior surface of the tubular support. The bevel gear box assembly 14 may be operatively coupled to a steering gear 60 of the vehicle (not shown) when installed in the vehicle.

To ensure that the upper and lower steering column members 20 and 22 are retained in position axially relative to one another, a releasable telescope locking mechanism 30 (FIG. 3) locks the upper and lower steering column members in any selected one of a plurality of telescope positions axially relative to one another. To ensure that the input shaft 24 and the upper steering column member 20 are retained in position angularly relative to one another, a releasable tilt locking mechanism 32 locks the input shaft in any selected one of a plurality of pivot positions relative to the upper steering column member. The releasable telescope locking mechanism 30 and the releasable tilt locking mechanism 32 are substantially similar in construction and in operation to the releasable telescope locking mechanism and the releasable tilt locking mechanism described and illustrated in U.S. Pat. No. 5,711,189.

The releasable tilt locking mechanism 32 comprises a bracket 66, a tilt lock bar 190, a torsion spring 120, an actuator member 116, and a handle 114. The bracket 66 is pivotally connected to the upper housing 43 such that the upper housing is pivotable relative to the bracket about an axis coincident with axis A. The bracket 66 is also immovably connected or fixed to a jacket tube 68 that circumscribes the upper steering column member 20. The jacket tube 68 is a component of the releasable telescope locking mechanism 30. The upper housing 48 is pivotable, therefore, about the axis A relative to the bracket 66 and the jacket tube 68. The upper housing 48 pivots along with the input shaft 24 relative to the bracket 88 and the upper steering column member 20.

The bracket 66 includes generally parallel sidewalls 102. Portions (not shown) of the bracket 66 extend radially inwardly from the sidewalls 102 and are immovably connected or fixed to an upper portion of the jacket tube 68. Two strap portions 110 of the bracket 66 extend between and join the sidewalls 102. The sidewalls 102 and the strap portions 110 of the bracket 66 define a space 119 within the bracket 66 that receives the releasable telescope locking mechanism 30 and certain other components of the releasable tilt locking mechanism 32. The bracket 66 thus partially encloses the releasable telescope locking mechanism 30 and certain of the other components of the releasable tilt locking mechanism 32.

The handle 114 and the actuator member 116, which is connected to the handle, are pivotally mounted on the upper strap portion 110 of the bracket 66 by a pin 117. A lower portion 118 of the actuator member 116 extends into the space 118 partially enclosed by the sidewalls 102 and the strap portions 110 of the bracket 66. The torsion spring 120 extends around the actuator member 116 to bias the handle 114 and the actuator member to an initial position in which the releasable telescope locking mechanism 30 and the releasable tilt locking mechanism 32 are locked. The handle 114, the actuator member 116, and the torsion spring 120 are movable together with the bracket 86, the jacket tube 88, and the upper steering column member 20 relative to the lower steering column member 22 when, for example, the releasable telescope locking mechanism 30 is unlocked.

An end portion 122 of the torsion spring 120 engages the upper strap portion 110 of the bracket 66. The opposite end portion 124 of the torsion spring 120 engages a telescope locking member 130 (FIG. 3), which is a component of the releasable telescope locking mechanism 30. The telescope locking member 130 is made from a contoured rod and includes a longitudinally extending toothed portion 132 formed with a plurality of relatively small teeth (not shown). The toothed portion 132 extends parallel to the jacket tube 68 and the upper and lower steering column members 20 and 22. The toothed portion 132 extends into a slot 135 in the tubular support 78. The teeth (not shown) of the toothed portion 132 are engageable with a plurality of relatively small teeth 136 formed on an exterior surface of the jacket tube 68.

The telescope locking member 130 includes an upper support portion 142 and a lower support portion 144 located on axially opposite ends of the toothed portion 132. The upper and lower support portions 142 and 144 are coaxial with each other and are laterally offset from the toothed portion 132. The upper and lower support portions 142 and 144 are pivotally received in pivot supports 150 connected to the tubular support 78 in any known manner.

A first end portion 154 of the telescope locking member 130 extends from the upper support portion 142 and is laterally offset from the upper and lower support portions 142 and 144 and from the toothed portion 132. A second end portion 156 of the telescope locking member 130 extends from adjacent to the first end portion 154 toward a curved portion 158. An angled portion 160 of the telescope locking member 130 extends at an acute angle away from the lower support portion 144 and toward the actuator member 116. Another straight portion 182 of the telescope locking member 130 interconnects the curved portion 158 and the angled portion 160 of the telescope locking member 130.

The first end portion 154 of the telescope locking member 130 is received in a hook member 172. The hook member 172 has an opening 174 with tabs 176 extending into the opening. A preloaded cell spring 180 is received in the opening 174 with the tabs 176 extending into a central space encircled by the coil spring to retain the coil spring in the opening 174. The coil spring 180 acts between the hook member 172 and a member (not shown) that is connected in any known manner to the tubular support 78 and that releasably engages the jacket tubs 68.

Pivotal movement of the telescope locking member 130 causes compression of the coil spring 180 and also causes the jacket tube 68 to be clamped against an inner surface (not shown) of the tubular support 78 to prevent the jacket tube from moving axially relative to the telescope looking member while the teeth (not shown) on the locking member and the teeth 136 on the jacket tube are partially engaged.

The tubular support 78 has a longitudinally extending slot 134. A bolt 186 extends through an opening in the lower strap portion 110 of the bracket 86, through the slot 184, and screws into the jacket tube 68. A sleeve 163 circumscribes the bolt 186 and extends between the lower strap portion 110 of the bracket 66 and the jacket tube 68. The axial ends of the slot 184 engage the sleeve 188 to define the limits of axial movement of the upper steering column member 20 relative to the tower steering column member 22. The bolt 186 and sleeve 186 also provide support for the bracket 66.

The tilt-lock bar 190 of the releasable tilt locking mechanism 32 is pivotally connected to the upper housing 48 by a pin 192. The tilt-lock bar 190 extends downward, as viewed in FIG. 3, through a tubular member 194. The tubular member 194 is pivotally connected to one of the sidewalls 102 of the bracket 66.

First and second bushings (not shown) are located within the tubular member 194. The bushings are connected to the tubular member 194 and support the tilt-lock bar 190 for axial movement relative to the tubular member. The bushings are located on opposite sides of a lever (not shown). A first coil spring (not shown) is connected at one end to a first bushing and at its other end to the lever. A second coil spring (not shown) is connected at one end to the second bushing and at its other end to the lever. The coil springs are normally tightly wound on the periphery of the tilt-lock bar 190 so that, when fully wound, they grip the tilt-lock bar to prevent relative movement between the tilt-lock bar and the tubular member 194. Rotation of the lever (not shown) about the axis of the tilt-lock bar 190 causes the coil springs (not shown) to become partially unwound and release their grip on the tilt-lock bar.

The lever (not shown) has a control extension (not shown) engaging the lower portion 113 of the actuator member 116. A body portion of the control extension extends around portions of the coil springs. An inner end of each of the coil springs is fixed to the lever. Outer ends of the coil springs are fixed within the bushings and, thus, to the tubular member 194. Accordingly, when the lever is rotated about the tilt-lock bar 190, the outer ends of the coil springs cannot be moved about the axis of the tilt-look bar 190 and the force imparted to the coil springs by the fever causes the coil springs to unwind.

A tilt spring (not shown) extends between a flange on the tilt-lock bar 190 and a flange on the tubular member 194. The tilt spring biases the input shaft 24 to pivot in a counterclockwise direction, as viewed in FIG. 3, relative to the upper steering column member 20.

The lower portion 118 of the actuator member 116, which extends into the space 119 in the bracket 66, is engagable with the straight portion 162 of the telescope locking member 130 and with the lever (not shown) in the tubular member 194. Upon pivoting the handle 114 and the actuator member 116 in one rotational direction, which is clockwise, as viewed in FIG. 3, the actuator member engages the straight portion 182 of the telescope locking member 130 and moves the telescope locking member 130 to release the releasable telescope locking mechanism 30. Upon pivoting the handle 114 and the actuator member 116 in another rotational direction, which is counter-clockwise, as viewed in FIG. 3, the actuator member engages and moves the lever (not shown) in the tubular member 194 to unlock the releasable tilt locking mechanism 32.

Upon pivoting of the handle 114 and the actuator member 116 so that the lower portion 118 of the actuator member moves the straight portion 162 of the telescope locking member 130, the telescope locking member pivots about an axis that passes through the upper and lower support portions 142 and 144. Upon pivotal movement of the telescope locking member 130, the teeth (not shown) of the toothed portion 132 disengage from the teeth 136 on the jacket tube 68. The telescope locking member 130 also releases the jacket tube 68 from being clamped. The telescope locking member 130 thus releases the jacket tube 68 and the upper steering column member 20 so they can be moved axially or telescoped relative to the lower steering column member 22.

Upon pivoting of the handle 114 and the actuator member 116 so that the lower portion 118 of the actuator member moves the lever (not shown) in the tubular member 194, the coil springs (not shown) are unwound to allow the tilt-lock bar 190 to move relative to the tubular member 194. The input shaft 24 can, therefore, pivot relative to the upper steering column member 20. Upon release of the handle 114 and the actuator member 116 after the input shaft 24 has been pivotally positioned relative to the upper steering column member 20, the coil springs (not shown) cause the lever (not shown) in the tubular member 194 to move the handle 114 and the actuator member 116 to their initial positions.

When the releasable tilt locking mechanism 32 is released, the tilt-lock bar 190 is movable relative to the tubular member 194 and the bracket 66 to position the input shaft 24 in any one of a multiple number of pivot positions. While adjusting the pivot position of the input shaft 24, the tilt-lock bar 190 pivots relative to the upper housing 48, and the tilt-lock bar and the tubular member 184 pivot together relative to the bracket 66.

As stated above, the upper column assembly 12 and the bevel gear box assembly 14 are connected or attached to each other. Mom specifically, the bevel gear box assembly 14 (FIG. 4) comprises a housing 34, a first bevel gear 36 received in the housing, and a second bevel gear 33 received in the housing. The housing 34 includes two outwardly extending annular bosses 35 that are disposed diametrically opposite one another across the housing. The bosses 35 receive the fasteners 16. An enlarged bead 15 of each fastener 16 abuts its corresponding boss 35. An externally threaded shaft 17 of each fastener 16 extends through the corresponding boss 35. The externally threaded shafts 17 of the fasteners 16 screw into internally threaded passages 84 in a radially outwardly extending flange 82 of the tubular support 78. To help retain the externally threaded shafts 17 of the fasteners 16 in the internally threaded passages 84 of the flange 82, an adhesive material, such as a Loctite brand adhesive, may be applied to the threads of the fasteners and/or the threads of the passages. Cotter pins may also be inserted into openings formed in the externally threaded shafts 17.

The first bevel gear 36 is formed with teeth 37 that mesh with and engage teeth 38 formed en the second bevel gear 33. A first stub shaft 40 is joined at one end to the first bevel gear 36. The first stub shaft 40 extends away from the first bevel gear 36 toward the upper column assembly 12 and, particularly, toward the lower end portion 75 of the lower steering column member 22. The end portion 44 of the first stub shaft 40 opposite the first bevel gear 36 is splined. The first stub shaft 40 is effectively the input shaft of the bevel gear box assembly 14. A second stub shaft 42 is joined at one end to the second bevel gear 38. The second stub shaft 42 extends away from the second bevel gear 38 and away from the upper column assembly 12. The second stub shaft 42 is oriented approximately perpendicular to the first stub shaft 40. The end portion 46 of the second stub shaft 42 opposite the second bevel gear 38 is splined. The second stub shaft 42 is effectively the output shaft of the bevel gear box assembly 14.

The lower end portion 75 of the lower steering column member 22 in the upper column assembly 12 is operatively coupled to the first stub shaft 40 of the bevel gear box assembly 14 by the sleeve 18. Specifically, the external splines 77 on the lower end portion 75 of the lower steering column member 22 engage the internal splines 19 (FIG. 4A) at one end of the sleeve 18. The external splines 45 on the end portion 44 of the first stub shaft 40 engage the internal splines 10 at the opposite end of the sleeve 18. The splined connection through the sleeve 18 ensures that rotational movement of the lower end portion 75 of the lower steering column member 22 about its central longitudinal axis 23 effects rotational movement of the first stub shaft 40, which is the input shaft of the bevel gear box assembly 14, about the central longitudinal axis 41 of the first stub shaft.

Rotational movement of the first stub shaft 40 about its central longitudinal axis 41 is transmitted to the first bevel gear 36, to which the first stub shaft is joined. Rotational movement of the first bevel gear 36 is transmitted to the second bevel gear 38 through the teeth 37 of the first bevel gears which mesh with and engage the teeth 39 formed on the second bevel gear 38. Rotational movement of the second bevel gear 38 is transmitted to the second stub shaft 42, to which the second bevel gear is joined. Rotational movement of the first stub shaft 40 about its central longitudinal axis 41 is thus transmitted to and effects rotational movement of the second stub shaft 42 about its central longitudinal axis 43. As can be seen in FIG. 4, the central longitudinal axis 43 of the second stub shaft 42 is oriented transverse to the central longitudinal axis 41 of the first stub shaft 40 and the central longitudinal axis 23 of the lower end portion 75 of the lower steering column member 22. The angle between the central longitudinal axis 43 and the central longitudinal axes 41 and 23, which are coaxial, is greater than 0° and less than 180°. As shown in FIG. 4, the angle between the central longitudinal axis 43 and the central longitudinal axes 41 and 23, which are coaxial, is approximately 90°. The central longitudinal axis 43 is thus substantially perpendicular to the central longitudinal axes 41 and 23.

When the steering column 10 is installed in a vehicle (not shown), a vehicle hand wheel or steering wheel 28 (FIG. 1) is attached to the input shaft 24. Rotation of the steering wheel 28 is transmitted to the input shaft 24. Rotation of the input shaft 24 is transmitted to the rotatable upper steering column member 20 and then from the upper steering column member to the rotatable lower steering column member 22. The upper and lower steering column members 20 and 22 may be telescoped relative to one another to effect axial or vertical adjustment or movement of the steering wheel 28. The input shaft 24 and the upper steering column member 20 may be pivoted relative to one another to effect angular or pivotal adjustment or movement of the steering wheel 28. Rotation of the rotatable lower steering column member 22 is transmitted via the sleeve 18 to the first stub shaft 40 of the bevel gear box assembly 14 and then from the first stub shaft to the second stub shaft 42. The second stub shaft 42 is configured, for example, by being formed with outer splines, and dimensioned such that the second stub shaft may be operatively coupled to a vehicle steering gear 60 (shown schematically in FIG. 1). Rotation of the second stub shaft 42 of the bevel gear box assembly may thus be transmitted to the vehicle steering gear 60. The vehicle steering gear 60, in turn, is configured such that the vehicle steering gear may be operatively coupled to a set of steerable vehicle wheels 62 (shown schematically in FIG. 1). Thus, rotation of the steering wheel 28 may be transmitted by the steering column 10 to the vehicle steering gear 60 to effect steering of the set of steerable vehicle wheels 62.

Although the telescope locking member 130 is described as having teeth for engaging the teeth 136 on the jacket tube 68, it is contemplated that clamping members alone would prevent axial movement between the upper and lower steering column members 20 and 22. Therefore, the telescope locking member 130 and the jacket tube 68 could be made without teeth.

From the above description of the invention, those skilled in the art will perceive improvements, changes and modifications. Such improvements, changes and modifications within the skill of the art are intended to be covered by the appended claims.

Having described the invention, the following is claimed:
1. A steering column for a vehicle comprising:
(a) an upper column assembly including a column member housing; and
(b) a bevel gear box assembly including a bevel gear box housing,
the bevel gear box housing being directly attached to the column member housing such that the bevel gear box assembly and the upper column assembly form an integrated structure, the bevel gear box assembly also being operatively coupled to the upper column assembly such that rotational movement is transferred from the upper column assembly to the bevel gear box assembly,
wherein the upper column assembly also comprises an upper column input shaft and an upper column output shaft, the upper column output shaft being operatively coupled to the upper column input shaft such that rotational movement of the upper column input shaft about a central longitudinal axis of the upper column input shaft effects rotational movement of the upper column output shaft about a central longitudinal axis of the upper column output shaft,
the bevel gear box assembly also comprising a bevel gear box input shaft and a bevel gear box output shaft, the bevel gear box output shaft being operatively coupled to the bevel gear box input shaft such that rotational movement of the bevel gear box input shaft about a central longitudinal axis of the bevel gear box input shaft effects rotational movement of the bevel gear box output shaft about a central longitudinal axis of the bevel gear box output shaft,
the bevel gear box input shaft being operatively coupled to the upper column output shaft such that rotational movement of the upper column output shaft about the central longitudinal axis of the upper column output shaft effects rotational movement of the bevel gear box input shaft about the central longitudinal axis of the bevel gear box input shaft, wherein the central longitudinal axis of the bevel gear box output shaft is oriented at an angle greater than 0° and less than 180° with respect to the central longitudinal axis of the upper column output shaft.

2. A steering column as set forth in claim 1 wherein the central longitudinal axis of the bevel gear box output shaft is substantially perpendicular to the central longitudinal axis of the upper column output shaft.

3. A steering column as set forth in claim 1 wherein the bevel gear box output shaft is configured and dimensioned to be operatively coupled to a set of steerable vehicle wheels.

4. A steering column as set forth in claim 3 wherein the bevel gear box output shaft is configured and dimensioned to be operatively coupled to a vehicle steering gear, the vehicle steering gear being configured and dimensioned to be operatively coupled to the set of steerable vehicle wheels.

5. A steering column as set forth in claim 1 wherein the bevel gear box assembly also comprises two bevel gears operatively engaged with each other.

6. A steering column as set forth in claim 1 wherein the upper column assembly is configured to telescope and to tilt.

7. A steering column as set forth in claim 6 wherein the upper column assembly also comprises a first steering column member and second steering column member operatively coupled to each other such that rotational movement of the first steering column member is transmitted to the second steering column member, the first and second steering column members also being operatively coupled to each other such that the first and second steering column members are axially and telescopically movable relative to each other.

8. A steering column as set forth in claim 6 wherein the upper column assembly also comprises the upper column input shaft and a steering column member operatively coupled to each other such that rotational movement of the upper column input shaft is transmitted to the steering column member, the upper column input shaft and the steering column member also being operatively coupled to each other such that the upper column input shaft and the steering column member are pivotable relative to each other.

9. A steering column as set forth in claim 1 wherein the bevel gear box assembly is attached to the upper column assembly such that the bevel gear box assembly and the upper column assembly can be handled and installed in a vehicle as an integrated structure free of any need to handle and install the bevel gear box and the upper column assembly individually.

10. A steering column as set forth in claim 1 wherein the column member housing includes an outwardly extending flange in which an opening is formed, the bevel gear box housing including an outwardly extending boss, a fastener being received in the outwardly extending boss and in the opening of the outwardly extending flange to attach the bevel gear box housing to the column member housing.

11. A steering column as set forth in claim 1 wherein the bevel gear box assembly is attached to the upper column assembly such that the bevel gear box assembly and the upper column assembly can be handled and installed in a vehicle as a single integrated unit free of any need to handle and install the bevel gear box and the upper column assembly individually.

12. A steering column for a vehicle comprising:
 (a) an upper column assembly; and
 (b) a bevel gear box assembly,
 the bevel gear box assembly being attached to the upper column assembly to form an integrated structure, the bevel gear box assembly also being operatively coupled to the upper column assembly such that rotational movement is transferred from the upper column assembly to the bevel gear box assembly,
 the steering column further comprising a sleeve operatively coupling the bevel gear box assembly to the upper column assembly such that rotational movement is transferred from the upper column assembly to the bevel gear box assembly,
 the upper column assembly comprising an input shaft, a first steering column member, and a second steering column member,
 the input shaft and the first steering column member being operatively coupled to each other such that rotational movement of the input shaft is transmitted to the first steering column member, the input shaft and the first steering column member also being operatively coupled to each other such that the input shaft and the first steering column member are pivotable relative to each other,
 the first and second steering column members being operatively coupled to each other such that rotational movement of the first steering column member is transmitted to the second steering column member, the first and second steering column members also being operatively coupled to each other such that the first and second steering column members are axially and telescopically movable relative to each other,
 the bevel gear box assembly comprising a first bevel gear, a second bevel gear operatively engaged with the first bevel gear, a bevel gear box input shaft attached to the first bevel gear, and a bevel gear box output shaft attached to the second bevel gear,
 the sleeve engaging both the second steering column member and the bevel gear box input shaft such that rotational movement of the second steering column member about a central longitudinal axis of the second steering column member effects rotational movement of the bevel gear box input shaft about a central longitudinal axis of the bevel gear box input shaft.

* * * * *